United States Patent
Schleicher et al.

(10) Patent No.: US 6,638,643 B2
(45) Date of Patent: *Oct. 28, 2003

(54) ELECTRICALLY CONDUCTIVE METAL TAPE AND PLUG CONNECTOR MADE OF IT

(75) Inventors: Klaus Schleicher, Stolberg (DE); Robert Leffers, Mönchengladbach (DE); Thomas Helmenkamp, Osnabrück (DE); Jürgen Gebhardt, Osnabrück (DE); Udo Adler, Eschweiler (DE)

(73) Assignee: Stolberger Metallwerke GmbH & Co KG, Stolberg (DE)

(*) Notice: Subject to any disclaimer, the term of this patent is extended or adjusted under 35 U.S.C. 154(b) by 70 days.

This patent is subject to a terminal disclaimer.

(21) Appl. No.: 09/860,049

(22) Filed: May 17, 2001

(65) Prior Publication Data

US 2001/0055697 A1 Dec. 27, 2001

(30) Foreign Application Priority Data

May 20, 2000 (DE) .......................... 100 25 106

(51) Int. Cl.⁷ ..................... B32B 15/20; B32B 13/03
(52) U.S. Cl. .................. 428/647; 426/939; 439/886; 439/887
(58) Field of Search ................. 428/647, 929; 439/886, 887; 420/473, 476, 481, 483, 488, 497

(56) References Cited

U.S. PATENT DOCUMENTS

| | | | | | |
|---|---|---|---|---|---|
| 4,908,275 A | * | 3/1990 | Tsuji et al. | ................ | 428/457 |
| 5,075,176 A | * | 12/1991 | Brinkmann | ................ | 428/646 |
| 5,508,001 A | * | 4/1996 | Suzuki et al. | ............... | 148/433 |
| 5,766,776 A | * | 6/1998 | Buresch | ...................... | 420/557 |
| 5,849,424 A | * | 12/1998 | Sugawara et al. | ........... | 148/536 |
| 5,911,866 A | * | 6/1999 | Oshima et al. | ............. | 313/402 |
| 5,948,235 A | * | 9/1999 | Arai | ........................... | 106/1.25 |
| 5,997,810 A | * | 12/1999 | Futatsuka et al. | ........... | 420/472 |
| 6,207,035 B1 | * | 3/2001 | Adler et al. | ................. | 205/154 |
| 6,336,979 B1 | * | 1/2002 | Sugawara et al. | .......... | 148/282 |

FOREIGN PATENT DOCUMENTS

| | | | |
|---|---|---|---|
| EP | 0917951 A1 | * | 5/1999 |
| JP | 63-105943 | * | 5/1988 |
| JP | 63-262448 | * | 10/1988 |
| JP | 7-183356 | * | 1/1995 |

* cited by examiner

Primary Examiner—John J. Zimmerman
(74) Attorney, Agent, or Firm—Kenyon & Kenyon

(57) ABSTRACT

An electrically conductive metal tape for manufacturing electrical contact components, in particular plug connectors, having a base material made of a copper alloy having nickel proportions between 1.0 and 4.0% by weight, silicon proportions of 0.08 to 1.0% by weight, tin proportions between 0.02 and 1.0% by weight, zinc proportions of 0.01 to 2.0% by weight, zirconium proportions of 0.005 to 0.2% by weight and silver proportions between 0.02 to 0.5% by weight, the coating consisting of a tin-silver alloy having a silver proportion between 1.0 and 3.8% by weight. Particularly positive properties are displayed by a metal tape whose base material is made of a copper alloy having proportions of nickel between 1.4 and 1.7% by weight, silicon from 0.2 to 0.35% by weight, tin between 0.02 and 0.3% by weight, as well as zinc from 0.01 to 0.3% by weight.

20 Claims, No Drawings

ELECTRICALLY CONDUCTIVE METAL TAPE AND PLUG CONNECTOR MADE OF IT

BACKGROUND OF THE INVENTION

1. Field of the Invention

The present invention relates to an electrically conductive metal tape for manufacturing electrical contact components as well as a plug connector made of it.

2. Description of Related Art

Plug contact connectors are widespread in electronic applications. Basically, a mechanical device is understood by this, made up of a plug and plug socket for opening and closing an electrically conductive connection. Plug contact connections are used in the most varied application areas, for example in motor vehicle electrical equipment, news technology or industrial plant electronics.

A common manufacturing method of such plug contact elements is to punch out blanks from a copper or copper alloy tape, and to process these further into plug contact elements. Copper has high conductivity. To protect against corrosion and wear, as well as to raise surface hardness, the copper or copper alloy tapes are first tinned. Tin is suitable because of its good corrosion stability, especially as coating material for copper. Applying the layer by the hot-dip method counts as a part of standard technology.

In this connection, the most varied tin alloys are known for surface coating the base material, particularly including tin-silver alloys, since these count among the very good contact materials.

As described in European Patent No. 0 443 291, the base material of one plug contact element in an electrical plug connector pair is coated with pure tin or a tin-lead alloy, while the other plug contact element has a harder surface coating, applied in a molten procedure, of an alloy containing up to 10% by weight of silver. Besides silver, several further alloying metals are suggested. This approach points the way on manufacturing high quality plug connectors having constant, low contact resistance and least possible force (required) for plugging and unplugging.

The proposal according to German Patent No. 44 43 461 provides a surface coating of a tin alloy, applied molten, having up to 5% by weight of cobalt. Besides cobalt, the tin alloy can also contain bismuth and indium, as well as a plurality of additional alloying elements.

German Patent No. 36 28 783 describes an electrical connecting piece made of a copper alloy which has 0.3 to 2% by weight of magnesium, as well as 0.001 to 0.1% by weight of phosphorus. The electrical connecting pieces are distinguished by their strength, their electrical conductivity and strain relaxation properties at raised temperatures. They display satisfactory properties in use, even when produced in compact sizes and complicated shapes.

From German laid-open document No. 43 38 769, a copper alloy is also among the related art, for producing electrical plug connectors with a composition of essentially 0.5 to 3% by weight of nickel, 0.1 to 0.9% by weight of tin, 0.08 to 0.8% by weight of silicon, 0.1 to 0.3% by weight of zinc, 0.007 to 0.25% by weight of iron, 0.001 to 0.2% by weight of phosphorus, as well as 0.001 to 0.2% magnesium, having the principal component copper including as remainders the unavoidable impurities.

The known metal tapes, or rather, the plug connectors made of them have proven themselves in practice. However, the technical and qualitative requirements on contact components are growing increasingly, with regard to their mechanical and electrical properties. That is true particularly when the contact components are used under difficult or aggressive environmental conditions, e.g. for plug connectors in motor vehicle electrical equipment, and there, above all, in the electronics of the engine. Under such difficult application conditions, requirements can come up, particularly with regard to temperature stability, relaxation stability, corrosion resistance and adhesive strength of the coating, in which the known contact components are pushed to their limit. Peeling of the surface coating can then occur.

SUMMARY OF THE INVENTION

It is an object of the invention to create an electrically conductive metal tape for manufacturing electrical contact components, in particular plug connectors, with good electrical and mechanical properties, while improving the adhesion between base material and coating, which is of additional economic advantage.

This and other objects of the invention are attained by an electrically conductive metal tape for manufacturing electrical contact components, in particular plug connectors, having a base material made of a copper alloy which has a metal coating, applied using melting technology, made of tin-silver alloy, with an intermetallic phase being formed between the base material and the coating, wherein the base material includes, expressed in percentage by weight:

| | |
|---|---|
| nickel (Ni) | 1.0% to 4.0% |
| silicon (Si) | 0.08% to 1.0% |
| tin (Sn) | 0.02% to 1.0% |
| zinc (Zn) | 0.01% to 2.0% |
| zirconium (Zr) | 0.005% to 0.2% |
| silver (Ag) | 0.02% to 0.5% | the remainder being copper and including impurities resulting from smelting. The coating includes a tin-silver alloy having a silver proportion between 1% by weight and 3.8% by weight. In a preferred embodiment, the invention is a plug connector made from the electrically conductive metal tape.

DETAILED DESCRIPTION OF THE INVENTION

The base material of the electrically conductive metal tape is made of a copper alloy having a nickel proportion between 1.0 and 4.0% by weight, a silicon proportion of 0.08 to 1.0% by weight, a tin proportion between 0.02 and 1.0% by weight, a zinc proportion of 0.01 to 2.0% by weight, a zirconium proportion of 0.005 to 0.2% by weight, and a silver proportion between 0.02 to 0.5% by weight, the coating consisting of a tin-silver alloy having a silver proportion between 1.0 and 3.8% by weight.

Particularly positive results were obtained in trials with a base material made of a copper alloy with proportions of nickel between 1.4 and 1.7% by weight, silicon from 0.2 to 0.35% by weight, tin between 0.02 and 0.3% by weight, zinc from 0.01 to 0.3% by weight.

Because of the tin proportion in the base material, the latter's conductivity per se goes down, but for the same reason its strength and toughness go up. The reduction in conductivity is compensated by adding silver to the alloy. The main purpose of the silver portion is to take part, as a matrix component, in diffusion processes with the coating material and to influence the diffusion-driven phase formation of intermetallic compounds that is to be expected. Therefore, the silver proportion in the base material lies between 0.02% by weight and 0.5% by weight, whereas the coating has a silver proportion between 1% by weight and 3.8% by weight.

The silver proportion of the base material preferably amounts to 0.05% by weight to 0.2% by weight. The silver content in the coating preferably lies between 1.2% by weight and 2.5% by weight. This leads to a low transition resistance.

The zirconium, in a proportion of the base material between 0.005% by weight and 0.2% by weight, preferably, though, up to 0.05% by weight, raises the latter's corrosion and temperature stability, and improves its hot formability.

The metal tape according to the invention distinguishes itself first by its good electrical and mechanical properties, particularly by its good conductivity and relaxation resistance at a good formability and resistance to detachment of the coating. A stable contact transition resistance is assured. The metal tape has great temperature stability with low transition resistance. It is abrasion-resistant and resistant to being worn through, at greater hardness, yet it is workable and easily soldered. Plugging and unplugging forces are low at improved friction corrosion stability.

In addition, the metal tape is advantageous economically, since copper scrap containing tin proportions can be used in its production. During circulation of the substances an even tin balance is reached. Thereby, a uniform quality of the metal tapes made by using scrap can be secured. By adjusting the use of plain scrap (CuNiSi material), tinned scrap and new metal (copper), depending upon the thickness of the tin coating in the tinned scrap, a base material can be obtained as a poured product having a tin content of 0.02 to 1% by weight. Advantageous in this method are poured products with a tin content between 0.25 and 0.5% by weight.

The intermetallic phase between the base material and the coating is fine-grained and even. From this derives a good formability, in particular bendability, higher resistance to shearing and lower moduli of elasticity, as well as high resistance to creep of the metal tapes according to the present invention.

The alloy components zinc and silver influence the diffusion behavior in the intermetallic phase between the base material and the coating of tin-silver. The copper-tin phases, arising inevitably from diffusion of copper into the tin layer, are influenced in their development over temperature and time in the sense of a slowing down of, and interference with the formation especially of the so-called $\epsilon$-phase. This guarantees a substantially better adhesion between the base material and the coating. It delays detachment phenomena, in particular peeling of the coating even in difficult application conditions of the metal tape, or the plug connector made from it, until higher temperatures and longer times.

An important cause for a possible aging-related failure of the coating, particularly at temperatures above 150° C., is a disproportionately fast conversion of the so-called $\eta$-phase ($Cu_6Sn_5$) into the $\epsilon$-phase ($Cu_3Sn$) at the formation, starting from the phase boundary between base material and coating, because of high diffusion speeds. The present invention now makes use of the realization that the presence of the $\epsilon$-phase by itself does not necessarily lead to peeling processes at the boundary between the base material and the coating, not even in conjunction with a strain condition brought about by the forming process. If the development of the $\epsilon$-phase is prevented or hindered, this has a positive effect on the intermetallic phase and long-term stability of the coating.

In the proportions provided by the present invention, zinc and silver, as well as the nickel present in the base material, are suitable for suppressing, or substantially slowing down the rapid transformation of the $\eta$-phase to the $\epsilon$-phase, during the diffusion process and their participation in the formation of the intermetallic phase, especially through enrichment in the phase boundary, with the successful outcome of a homogeneous, highly adhesive bonding between base material and coating.

If indium is also added to the coating alloy, namely up to 10% by weight, but preferably between 0.1 and 5% by weight, it is true that the melting point is lowered, but on the whole, stability to outer conditions is improved. In addition, soldering properties are positively influenced by adding indium to the alloy.

Magnesium increases the strength and the strain relaxation properties at raised temperatures of the alloy, at only minor impairment of the electrical conductivity, which is based on the main component—copper. Magnesium dissolves in the copper matrix, and may be provided in the base material in a proportion up to 0.1% by weight. Furthermore, the base material may contain phosphorus in a proportion up to 0.05% by weight. The phosphorus acts as deoxidant, and, together with the magnesium, acts to increase the strength and the strain relaxation properties at increased temperatures. The phosphorus component also contributes to maintaining the spring strength of the metal tape during forming processes.

An improvement of the formability and also the hot rollability can be achieved by an iron proportion up to 0.1% by weight. The iron component also lessens the grain size during precipitation of the nickel and silicon compounds and resists the formation of crack structures, which, in turn, is positive for the adhesive strength between base material and coating.

What is claimed is:

1. An electrically conductive metal tape for electrical contact components, comprising: a base material made of a copper alloy having a metal coating made of tin-silver alloy, and an intermetallic phase between the base material and the coating; wherein the base material includes, expressed in percentage by weight:

| | |
|---|---|
| nickel (Ni) | 1.0% to 4.0% |
| silicon (Si) | 0.08% to 1.0% |
| tin (Sn) | 0.02% to 1.0% |
| zinc (Zn) | 0.01% to 2.0% |
| zirconium (Zr) | 0.005% to 0.2% |
| silver (Ag) | 0.02% to 0.5% | the remainder being copper; wherein the tin-silver alloy of the coating has a silver proportion between 1% by weight and 3.8% by weight; and wherein a conversion of an $\eta$-phase ($Cu_6Sn_5$) into a $\epsilon$-phase ($Cu_3Sn$) is hindered within the intermetallic phase.

2. The metal tape according to claim 1, wherein the silver content of the base material is from 0.05% by weight to 0.2% by weight.

3. The metal tape according to claim 1, wherein the silver content of the coating is from 1.2% by weight and 2.5% by weight.

4. The metal tape according to claim 2, wherein the silver content of the coating is from 1.2% by weight and 2.5% by weight.

5. The metal tape according to claim 1, wherein the coating contains indium up to 10% by weight.

6. The metal tape according to claim 5, wherein the indium content is from 0.1% by weight to 5% by weight.

7. The metal tape according to claim 2, wherein the coating contains indium up to 10% by weight.

8. The metal tape according to claim 3, wherein the coating contains indium up to 10% by weight.

9. The metal tape according to claim 4, wherein the coating contains indium up to 10% by weight.

10. The metal tape according to claim 1, wherein the base material contains up to 0.1% by weight of magnesium (Mg), up to 0.05% by weight of phosphorus (P) or up to 0.1% by weight iron (Fe).

11. The metal tape according to claim 2, wherein the base material contains up to 0.1% by weight of magnesium (Mg), up to 0.05% by weight of phosphorus (P) or up to 0.1% by weight iron (Fe).

12. The metal tape according to claim 3, wherein the base material contains up to 0.1% by weight of magnesium (Mg), up to 0.05% by weight of phosphorus (P) or up to 0.1% by weight iron (Fe).

13. The metal tape according to claim 4, wherein the base material contains up to 0.1% by weight of magnesium (Mg), up to 0.05% by weight of phosphorus (P) or up to 0.1% by weight iron (Fe).

14. The metal tape according to claim 5, wherein the base material contains up to 0.1% by weight of magnesium (Mg), up to 0.05% by weight of phosphorus (P) or up to 0.1% by weight iron (Fe).

15. The metal tape according to claim 7, wherein the base material contains up to 0.1% by weight of magnesium (Mg), up to 0.05% by weight of phosphorus (P) or up to 0.1% by weight iron (Fe).

16. The metal tape according to claim 8, wherein the base material contains up to 0.1% by weight of magnesium (Mg), up to 0.05% by weight of phosphorus (P) or up to 0.1% by weight iron (Fe).

17. A plug connector made of a metal tape according to claim 1.

18. A plug connector made of a metal tape according to claim 2.

19. A plug connector made of a metal tape according to claim 3.

20. A plug connector made of a metal tape according to claim 5.

* * * * *